(12) United States Patent
Rathnam et al.

(10) Patent No.: US 12,418,496 B2
(45) Date of Patent: Sep. 16, 2025

(54) DYNAMIC RESOURCE PLACEMENT IN MULTI-CLOUD ENVIRONMENTS

(71) Applicant: VMware LLC, Palo Alto, CA (US)

(72) Inventors: Abhiman Rathnam, Bangalore (IN); Neelu Sharma, Mumbai (IN); Narayanasamy Ramesh, Bangalore (IN); Prerna Jain, Bangalore (IN); Barnali Rakshit, Bangalore (IN); Vijay Kumar Patil, Bangalore (IN)

(73) Assignee: VMware LLC, Palo Alto, CA (US)

( * ) Notice: Subject to any disclaimer, the term of this patent is extended or adjusted under 35 U.S.C. 154(b) by 13 days.

(21) Appl. No.: 18/607,319

(22) Filed: Mar. 15, 2024

(65) Prior Publication Data

US 2025/0126074 A1 Apr. 17, 2025

(30) Foreign Application Priority Data

Oct. 11, 2023 (IN) .............................. 202341068293

(51) Int. Cl.
*H04L 47/762* (2022.01)
*H04L 47/78* (2022.01)

(52) U.S. Cl.
CPC .......... *H04L 47/762* (2013.01); *H04L 47/781* (2013.01)

(58) Field of Classification Search
CPC ............................ H04L 47/762; H04L 47/781
USPC ........................................................ 709/226
See application file for complete search history.

(56) References Cited

U.S. PATENT DOCUMENTS

| 2013/0346619 | A1* | 12/2013 | Panuganty | .......... H04L 41/0866 709/226 |
|---|---|---|---|---|
| 2016/0014042 | A1* | 1/2016 | Kampas | .................. H04L 47/80 709/226 |
| 2016/0043968 | A1* | 2/2016 | Jacob | .................... H04L 47/827 709/226 |
| 2023/0342179 | A1* | 10/2023 | Suttle | .................. H04L 41/0894 |

* cited by examiner

*Primary Examiner* — Wing F Chan
*Assistant Examiner* — Leon Y Tseng
(74) *Attorney, Agent, or Firm* — King Intellectual Asset Management (57) ABSTRACT

The disclosure provides a method for deploying resources in a multi-cloud environment. The method includes receiving, by a dynamic resource placement system, a request to generate a resource placement configuration for one or more resources to be deployed in a multi-cloud environment; obtaining, by the dynamic resource placement system, a custom resource placement logic; obtaining, by the dynamic resource placement system, a cloud context comprising details of available cloud environments in the multi-cloud environment; generating, by the dynamic resource placement system and based on analyzing the cloud context using the custom resource placement logic, a resource placement configuration specifying one or more target cloud environments for deploying the one or more resources; and providing, by the dynamic resource placement system, the resource placement configuration to a cloud infrastructure management platform for deploying the one or more resources.

20 Claims, 8 Drawing Sheets

```
Cloud Context                                402

# Cloud context array
cloud_context = [
    {
        "name": "AWS - us-east-1",
        "location": "North Virginia",
        "latency": 22,
        "cost": 0.12,
        "capabilities": ["compute", "storage"]
    },
    {
        "name": "Azure - centralus",
        "location": "Iowa",
        "latency": 27,
        "cost": 0.08,
        "capabilities": ["compute", "analytics"]
    },
    {
        "name": "GCP - us-central1",
        "location": "Iowa",
        "latency": 18,
        "cost": 0.14,
        "capabilities": ["storage", "networking"]
    }
]
```

DYNAMIC RESOURCE PLACEMENT IN MULTI-CLOUD ENVIRONMENTS

CROSS-REFERENCES

This application claims the benefit of Indian Patent Application number 202341068293, entitled "DYNAMIC RESOURCE PLACEMENT IN MULTI-CLOUD ENVIRONMENTS," filed on Oct. 11, 2023, of which is hereby incorporated by reference in its entirety.

BACKGROUND

Aspects of the present disclosure relate to automated optimization of cloud resource placement in multi-cloud environments.

Cloud computing environments allow enterprises to scale computing resources on demand. Multiple cloud providers offer resources, such as computing resources, storage resources, networking resources, analytics, and more services. Enterprises often utilize multiple cloud providers to take advantage of differing capabilities, costs, and geographic presence. Managing cloud resources across providers is complex. Each cloud provider has different interfaces, application programming interfaces (APIs), account structures, and resource constraints. Enterprises must carefully plan resource allocation to balance utilization, performance, and costs across providers. However, the dynamic nature of cloud computing makes it challenging to optimize resource placement. Existing cloud management platforms provide some capabilities to automate the deployment of resources in the cloud. However, the predefined logic in these platforms for resource allocation across providers and regions is limited. There is a need for more flexible and customizable cloud management platforms that allow enterprises to tailor automated resource deployment based on their unique requirements.

It should be noted that the information included in the Background section herein is simply meant to provide a reference for the discussion of certain embodiments in the Detailed Description. None of the information included in this Background should be considered as an admission of prior art.

SUMMARY

An embodiment disclosed herein includes a method for deploying resources in a multi-cloud environment. The method includes receiving, by a dynamic resource placement system, a request to generate a resource placement configuration for one or more resources to be deployed in a multi-cloud environment; obtaining, by the dynamic resource placement system, a custom resource placement logic, the custom resource placement logic comprising at least one user-defined custom script or user-defined custom policy; obtaining, by the dynamic resource placement system, a cloud context comprising details of available cloud environments in the multi-cloud environment; generating, by the dynamic resource placement system and based on analyzing the cloud context using the custom resource placement logic, a resource placement configuration specifying one or more target cloud environments for deploying the one or more resources; and providing, by the dynamic resource placement system, the resource placement configuration to a cloud infrastructure management platform for deploying the one or more resources.

Further embodiments include one or more non-transitory computer-readable storage media storing instructions that, when executed by a computer system, cause the computer system to perform the method set forth above, and a computer system including at least one processor and one or more memories configured to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Aspects of the present disclosure provide apparatuses, methods, processing systems, and computer-readable mediums for deploying resources in a multi-cloud environment based on a user-defined custom resource placement logic.

Existing cloud infrastructure management platforms utilize predefined resource placement logic to automate the deployment of computing resources across cloud providers. However, using predefined resource placement logic has several drawbacks. First, predefined resource placement logic takes a generalized one-size-fits-all approach and cannot adapt to different organizations' unique resource placement objectives and constraints. This may lead to suboptimal resource placement decisions and potentially limit the overall efficiency and effectiveness of the system. Additionally, predefined resource placement logic lacks the flexibility to change over time as company needs evolve. For example, predefined resource placement logic cannot adjust to shifts in workload patterns, changing security needs, or updates to compliance standards. Finally, customers cannot customize the resource placement logic as they have no access or control over the closed vendor platforms.

To address these problems, embodiments of the present disclosure are directed to a dynamic resource placement system that enables custom resource placement logic tailored to an organization's specific needs and requirements. In one embodiment, the dynamic resource placement system allows users to override a cloud infrastructure management platform's default or predefined resource placement logic with custom resource placement logic via user-defined scripts to implement customized resource placement algorithms. The user-defined scripts can include configurable filters to select target cloud environments and accounts based on user-defined selection criteria. For example, the cloud infrastructure management platform can access a user-defined script to specify the placement of resources, like virtual machines, containers, load balancers, storage resources, databases, etc., based on geographic restrictions, cost thresholds, or security needs.

In another embodiment, the dynamic resource placement system allows chaining together configurable policy rules to filter placement options across multiple constraints incrementally. As an example, resource placement policies can be combined to narrow resource placements to cloud environments, meeting both performance and regulatory needs. In a further embodiment, the dynamic resource placement system integrates with external data sources, including real-time cost, compliance, and utilization data, to enable dynamic placement decisions based on real-time metrics. By incorporating configurable policy rules, the dynamic resource placement system enables resource placement tuning that is not limited by a vendor platform.

As an example use case, a user at a company desires to deploy new cloud computing resources for their applications and services. The user's company currently utilizes a multi-cloud management platform to automate the deployment of resources, like virtual machines, across several public and/or private cloud providers. However, this user has specific placement objectives that need to be met based on their company's business needs and technical requirements. For example, the user may need to optimize resource deployment based on costs by utilizing discounted reserved instance pricing. That is, the user may have committed to a specific resource instance type in a specific geographic region for a particular period of time. In return, the user may have received substantial cost-savings depending on the cloud provider, the type of instance, and the term length. The user may also need to restrict the placement of resources to certain geographic regions for performance and regulatory reasons. Unfortunately, the existing multi-cloud management platform the user uses has hardcoded, one-size-fits-all resource placement logic that the user cannot customize. The user's only option is to use the vendor-defined resource placement logic that cannot adapt to their company's needs.

To address this issue, the user adopts a dynamic resource placement system, as described herein, that supports custom resource placement logic in the form of customized scripting and policy execution. The dynamic resource placement system provides an interface to allow the user to implement user-defined scripts created in scripting languages like Python and to implement configurable filters and user-defined selection criteria tailored to meet specific objectives. The user can customize a script with custom resource placement logic that selects cloud regions matching their geographic and latency needs. The user-defined script can filter the selected clouds and/or cloud regions to pick ones where the user has reserved instances to be leveraged to meet their cost targets. When the user requests new cloud resources, the custom resource placement logic overrides the vendor-provided predefined resource placement logic of the multi-cloud management platform and places resources in accordance with the custom resource placement logic specified in the user-defined script, thereby optimizing resource deployment across the clouds and cloud regions. This gives the user control to customize resource placement in an automated fashion based on specific needs of the user and/or their company.

The techniques discussed herein for dynamically placing resources in multi-cloud environments provide a technical solution to the problem of inflexible, one-size-fits-all predefined resource placement logic. The use of customizable scripts and policies enables optimized, tailored resource deployments based on an organization's unique objectives and constraints. This improves upon existing closed platforms with hardcoded placement algorithms. Further, the integration of external data sources and real-time metrics facilitates adaptive decision-making capabilities not provided by vendor-defined logic. The techniques therefore advance the field of multi-cloud management by enabling automated resource deployments customized to evolving needs.

The dynamic integration of configurable placement logic as described herein surpasses conventional predefined rules. The ability to interface configurable scripts and policies with cloud management platforms provides a flexible technical architecture. This allows organizations to optimize resource placement in a manner aligned with technical, business, and regulatory requirements. The techniques enable a customized technical solution tailored to an organization's needs versus being limited by vendor platforms. Further, the use of chaining policies, running simulations, and incorporating real-time data provides technical improvements in evaluating deployment options.

The techniques described herein for dynamic resource placement leverage customizable algorithms and policies to solve the technical problem of suboptimal, inefficient resource placement in multi-cloud environments. The integration of user-defined logic with management platforms improves technical deployment capabilities beyond inherent platform limitations. This provides organizations the ability to optimize cloud usage, costs, and performance based on configurable logic encoded using scripting languages and reusable policy chaining. The technical solution provides organizations with a customized automation solution for intelligent cloud resource management.

Figure 1A:
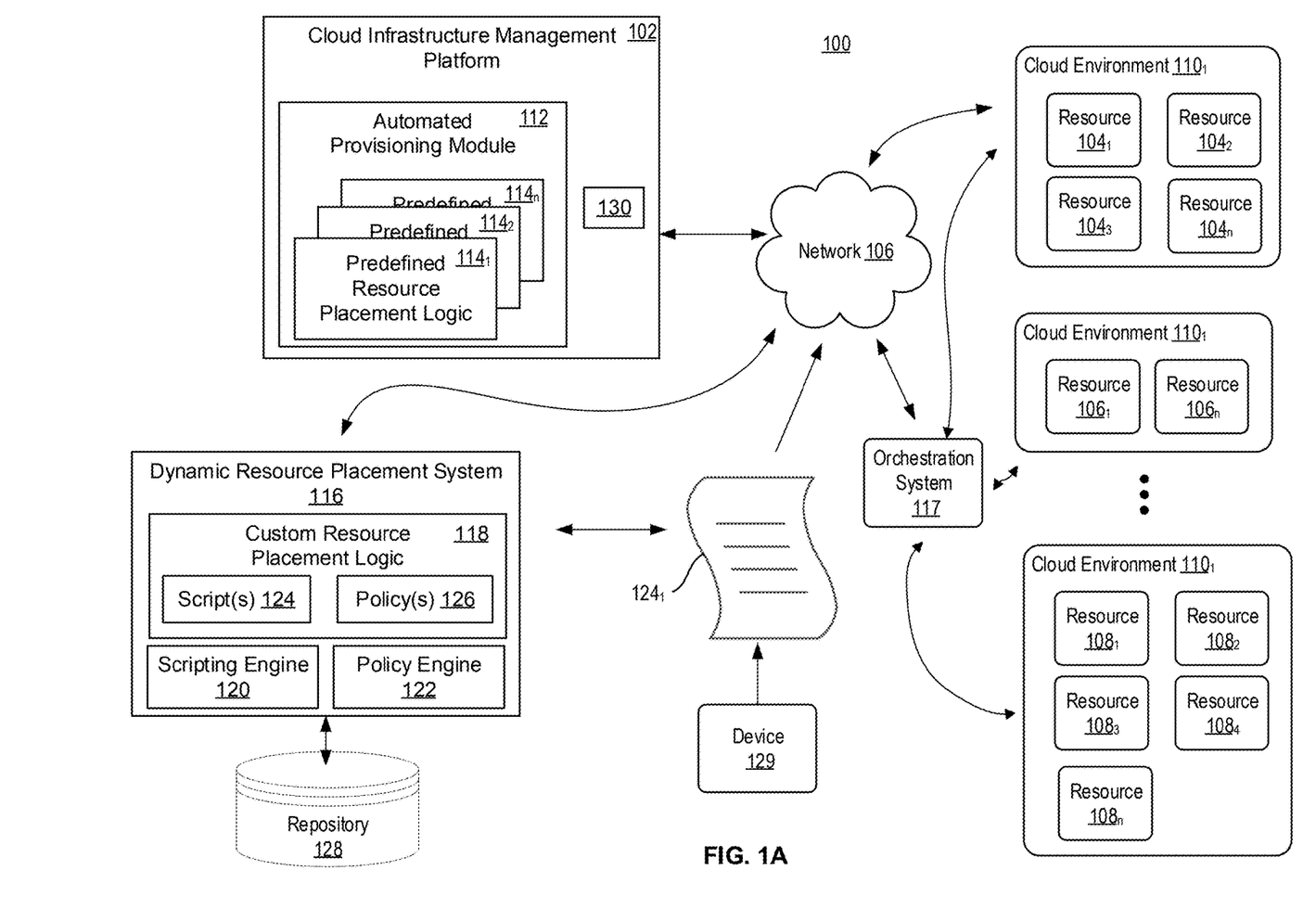
FIG. 1A-1C illustrate an exemplary architecture implementing a cloud infrastructure management platform for placing resources in various cloud environments.

FIG. 1A illustrates an exemplary architecture 100 implementing a cloud infrastructure management platform 102 for placing resources 104-108 in various cloud environments 110. Resources 104-108 include, but are not limited to, virtualized compute resources like virtual machines (VMs), containers, serverless functions; storage resources like disk storage, object storage, and block storage; databases like SQL and NoSQL; networking resources like virtual networks, load balancers, and virtual switches; and applications like software-as-a-service (Saas) applications. Various cloud environments 110 may be associated with the same or different cloud provider and/or may represent different zones, regions, or accounts associated with the same or different cloud provider. In some examples, cloud environments can be a private cloud, public cloud, or combinations thereof.

In examples, an automated provisioning module 112 of the cloud infrastructure management platform 102 may deploy and configure resources 104-108 in an automated manner without requiring manual intervention. Automated provisioning module 112 can include predefined provisioning workflows and templates that specify what resources need to be deployed and configured. Automated provisioning module 112 can deploy one or more resources 104-108 according to predefined resource placement logic 114. In examples, predefined resource placement logic 114 refers to predetermined rules or policies that specify which cloud environments (e.g., 110) resources (e.g., 104-108) should be placed in or assigned to when provisioned. As an example, predefined resource placement logic 1141 may specify that resources are to be placed in a balanced distribution configuration by distributing resources in a balanced, uniform fashion across available cloud regions, zones, and accounts. As another example, a predefined infrastructure configuration 1142 may specify that resources are to be deployed in a vertically scaling configuration by distributing resources, like storage and CPUs for a single server vertically, to a cloud environment 110 without adding new servers. As another example, a predefined infrastructure configuration 114n may specify that resources are to be deployed according to which of the cloud environments 110 has capacity. Automated provisioning module 112 can interact with an orchestration system 117 to automate the deployment, management, and coordination of the resources 104-108 based on the predefined resource placement logic 114. The automated provisioning module 112 automates and accelerates standard deployments using proven architectures and component arrangements. However, utilizing predefined resource placement logic 114 lacks flexibly and customizability, as previously discussed. Embodiments described herein allow users to override and/or enhance the predefined resource placement logic 114 by utilizing custom resource placement logic that is more tailored to their objectives.

In embodiments, automated provisioning module 112 can interact with an external system, such as the dynamic resource placement system 116, and employ user-defined custom resource placement logic 118. Dynamic resource placement system 116 can access cloud account information and identify an optimal cloud environment 110 for the placement of resources 104-108, based on the custom resource placement logic 118. Contrary to predefined resource placement logic 114, the use of custom resource placement logic 118 by cloud infrastructure management platform 102 places resources 104-108 in a manner that is not predetermined by automated provisioning module 112 or cloud infrastructure management platform 102. Configurable resource placement logic 118 can include or reference scripts, policies, and combinations of scripts and policies.

In examples, dynamic resource placement system 116 provides various interfaces enabling the custom resource placement logic 118, including a scripting engine 120 and a policy engine 122. The scripting engine 120 supports user-defined custom scripts 124 written in languages, such as but not limited to Python, Java, or JavaScript, that implement customized logic for selecting and filtering available cloud environments 110. As an example, user-defined custom script 124 written in Python applies cost and performance filtering criteria to select an optimal cloud region 110 for each resource 104-108 being placed. User-defined custom scripts 124 can be stored in a repository 128 and can be retrieved and executed by scripting engine 120.

The policy engine 122 supports filtering cloud environments 110 based on different user-defined custom policies 126. In examples, user-defined custom policies 126 can include configurable rule sets that can be chained together to filter cloud placement options. For instance, a first policy and a second policy can be applied in a serially manner, successively narrowing down target cloud environments. Custom policies 126 can be stored in repository 128 and can be retrieved and executed by policy engine 122. Device 129 (e.g., a personal computer (PC) or mobile device) can interface with the dynamic resource placement system 116 and/or the cloud infrastructure management platform 102 via network 106. In examples, a user can provide or customize a user-defined custom script 1241 or user-defined custom policy 1261 via the user device 129.

Repository 128 can include a collection of user-defined custom scripts 124 and user-defined custom policies 126 that automate resource placement based on specific business needs and requirements. Alternatively, or in addition, repository 128 can include a collection of custom resource placement logic 118 that automate resource placement based on specific business needs and requirement. For example, a user-defined custom script 124 can be reused with different cloud contexts without having to rewrite the resource placement logic from scratch. The user-defined custom script 124 can be stored in repository 128 and can be used by multiple teams for different cloud environments 110, thereby minimizing duplication of effort involved when supporting different cloud environments 110 and resources 104-108. Accordingly, having a collection of scripts, policies, and/or configurable placement logic in repository 128 increases efficiency when maintaining and updating custom resource placement logic 118.

Although depicted as residing external to the cloud infrastructure management platform 102, dynamic resource placement system 116 can be integrated into one or more aspects of cloud infrastructure management platform 102. That is, while cloud infrastructure management platform 102 can communicate with the dynamic resource placement system 116 utilizing one or more API calls, for example, one or more functions of the dynamic resource placement system 116 can be internal to the cloud infrastructure management platform 102, as depicted by reference character 130.

Figure 1B:
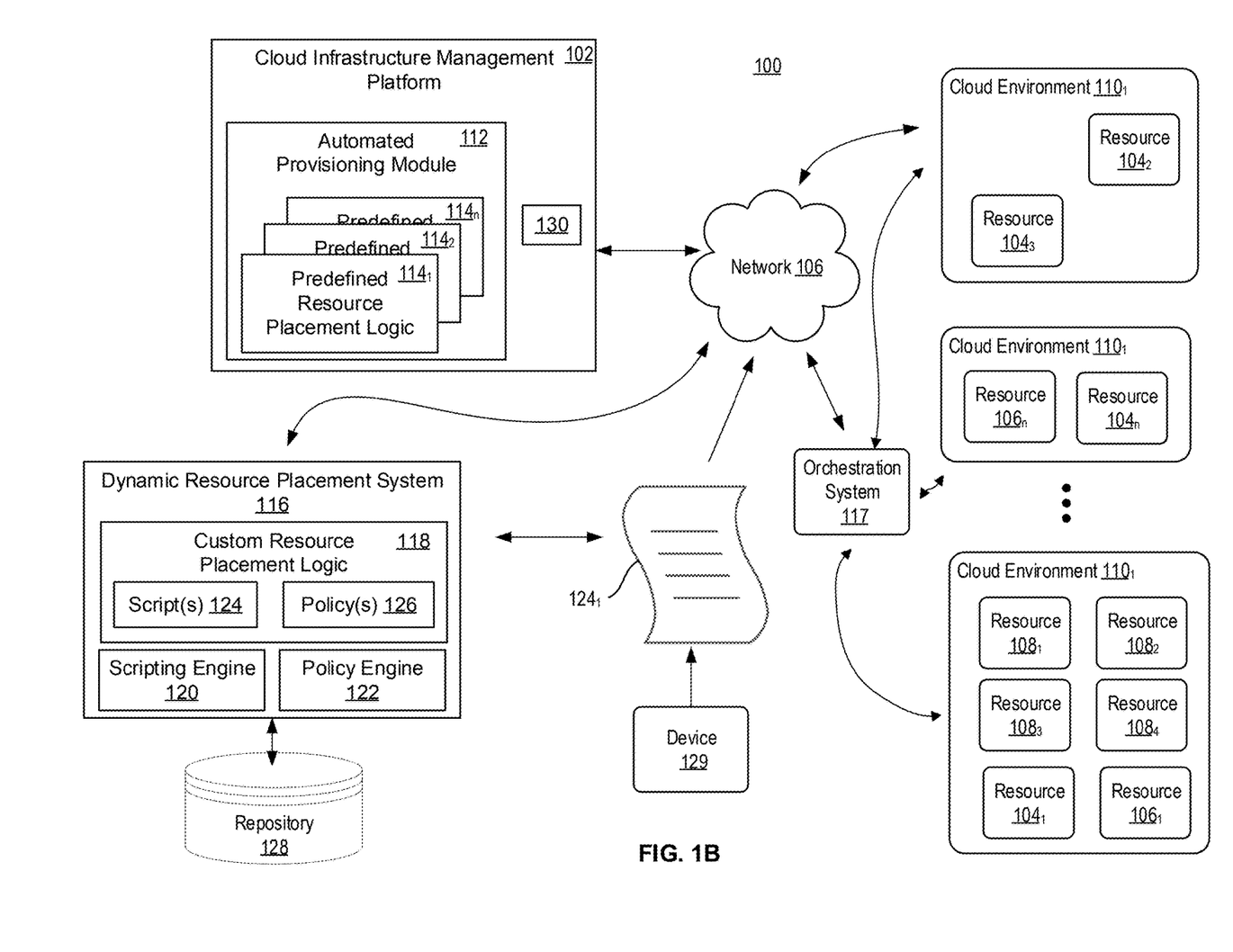

In some examples, and as depicted in FIG. 1B, the dynamic resource placement system 116 can periodically obtain or otherwise identify optimal cloud environments for resource placements and cause the cloud infrastructure management platform 102 to redeploy or redistribute resources 104-108 within cloud environments 110 based on the custom resource placement logic 118. Thus, the resources 104-108 within cloud environments 110 can change or shift depending on shifts in workload patterns, changing security needs, or updates to compliance standards workflows.

Figure 1C:
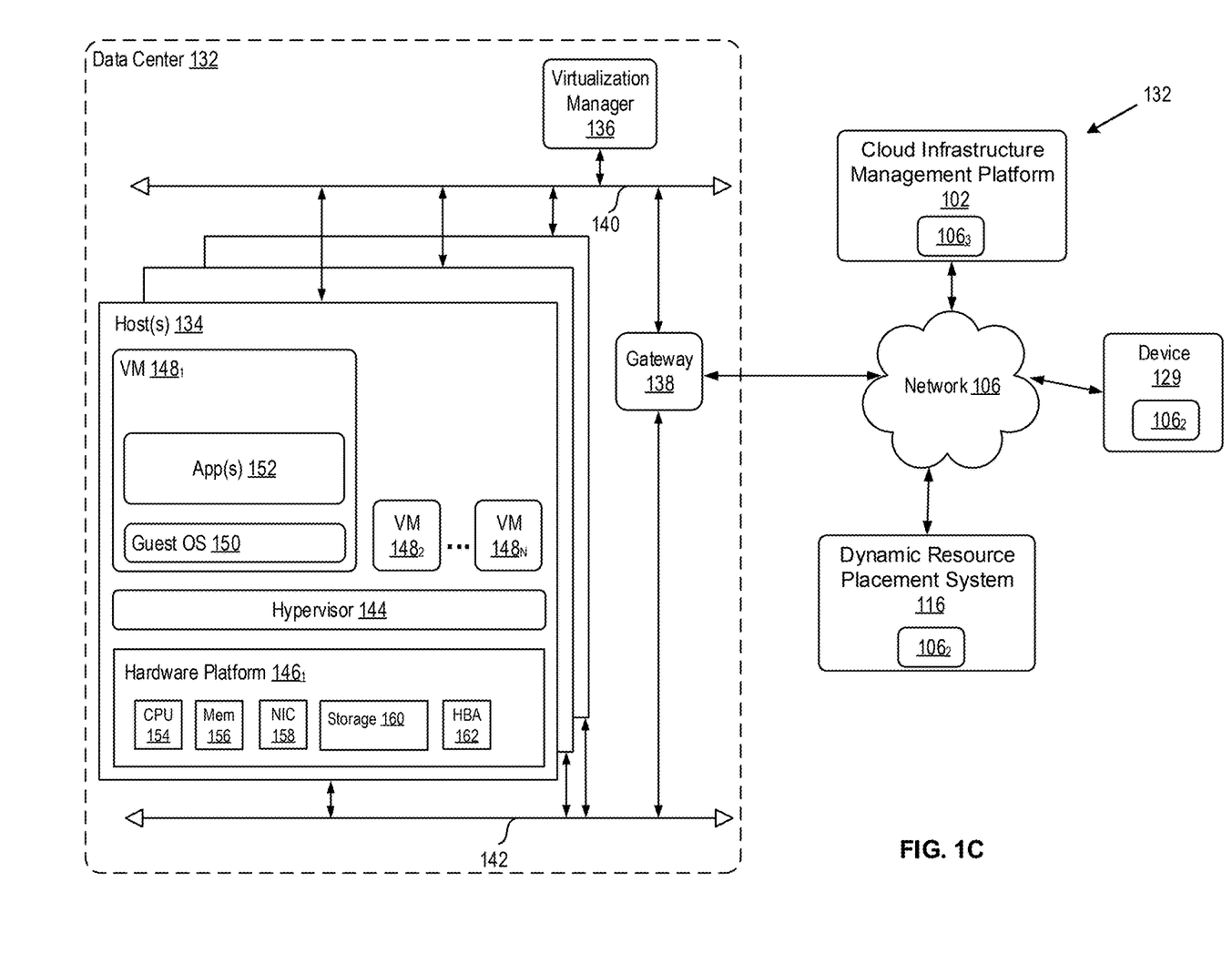

The cloud environment 110 comprises computational infrastructure and services distributed across one or more data center facilities 132, as depicted in FIG. 1C. Data center 132 includes host(s) 134, a virtualization manager 136, a gateway 138, a management network 140, and a data network 142. Although the management and data network are shown as separate physical networks, in some implementations the management network is logically isolated from the data network using different VLAN identifiers. Each of hosts 134 may be constructed on a server grade hardware platform 146, such as an x86 architecture platform. For example, hosts 134 may be geographically co-located servers on the same rack.

Host 134 is configured to provide a virtualization layer, also referred to as a hypervisor 144, that abstracts processor, memory, storage, and networking resources of hardware platform 146 into multiple VMs 1481 to 148N (collectively referred to as VMs 148 and individually referred to as VM 148) that run concurrently on the same host 134. Hypervisor 144 may run on top of the OS in host 134. In some embodiments, hypervisor 144 can be installed as system level software directly on hardware platform 146 of host 134 (often referred to as "bare metal" installation) and be conceptually interposed between the physical hardware and the guest OSs 150 executing in VMs 148. In some implementations, hypervisor 144 may comprise system level software as well as a "Domain 0" or "Root Partition" VM, which is a privileged machine that has access to the physical hardware resources of host 134. In this implementation, one or more of a virtual switch, virtual tunnel endpoint (VTEP), etc., along with hardware drivers, may reside in the privileged VM. Although the disclosure is described with reference to VMs, the teachings herein also apply to other types of virtual computing instances (VCIs), such as containers, Docker containers, data compute nodes, isolated user space instances, namespace containers, and the like. One example of hypervisor 144 that may be used is a VMware ESXi™ hypervisor provided as part of the VMware vSphere® solution made commercially available from VMware, Inc. of Palo Alto, California.

Each VM 148 includes a guest OS 150 and one or more applications 152. Application(s) 152 run on top of guest OS 150. Guest OS 150 may be a standard, commodity operating system. An application 152 may be any software program, such as an internet browser application.

Hardware platform 146 of each host 134 includes components of a computing device such as one or more processors (CPUs) 154, memory 156, a network interface card including one or more network adapters, also referred to as Network Interface Cards (NICs) 158, storage system 160, a host bus adapter (HBA) 162, and other input/output (I/O) devices such as, for example, a mouse and keyboard (not shown). CPU 154 is configured to execute instructions, for example, executable instructions that perform one or more operations described herein and that may be stored in memory 156 and in storage system 160. NIC 158 enables host 134 to communicate with other devices via a communication medium, such as management network 140 and/or data network 142. Storage system 160 represents persistent storage devices (e.g., one or more hard disks, flash memory modules, solid state disks (SSDs), and/or optical disks). HBA 162 couples host 134 to one or more external storages (not shown), such as a storage area network (SAN). Other external storage may be used, include network-attached storage (NAS) and other network data storage systems, which may be accessible via NIC 158.

Memory 156 is hardware allowing information, such as executable instructions, configurations, and other data, to be stored and retrieved. Memory 156 is where programs and data are kept when CPU 154 is actively using them. Memory 156 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 136 communicates with hosts 134 via a network, shown as management network 140, and carries out administrative tasks for data center 132 such as managing hosts 134, managing VMs 148 running within each host 134, provisioning VMs 148, migrating VMs 148 from one host 134 to another host, and load balancing between hosts 134. Virtualization manager 136 may be a computer program that resides and executes in a server in data center 132, or alternatively, virtualization manager 136 may run as a virtual appliance (e.g., a VM 148) in one of hosts 134. One example of a virtualization manager is the vCenter Server™ product made available from VMware, Inc. of Palo Alto, California.

Gateway 138 provides VMs 148 and other components in data center 132 with connectivity to network 106. Gateway 138 may manage external public internet protocol (IP) addresses for VMs 148, route traffic incoming to and outgoing from data center 132, and provide networking services, such as firewalls, network address translation (NAT), dynamic host configuration protocol (DHCP), and load balancing. Gateway 138 uses data network 142 to transmit data network packets to hosts 134. Gateway 138 may be a VCI, a physical device, or a software module running within host 134. Gateway 138 may include two gateways: a management gateway for management network 140 and a data gateway for data network 142.

The cloud environment 110 leverages this shared data center 132 infrastructure to deploy scalable, distributed services and applications that can adapt to dynamic demands. Cloud infrastructure management platform 102 determines (e.g., optimal) distribution and configuration of the resources 104-108 across the cloud environments 110 comprising available data centers 132. The orchestration system 117 then handles deployment and provisioning based on the custom resource placement logic 118 of the dynamic resource placement system 116.

Figure 2:
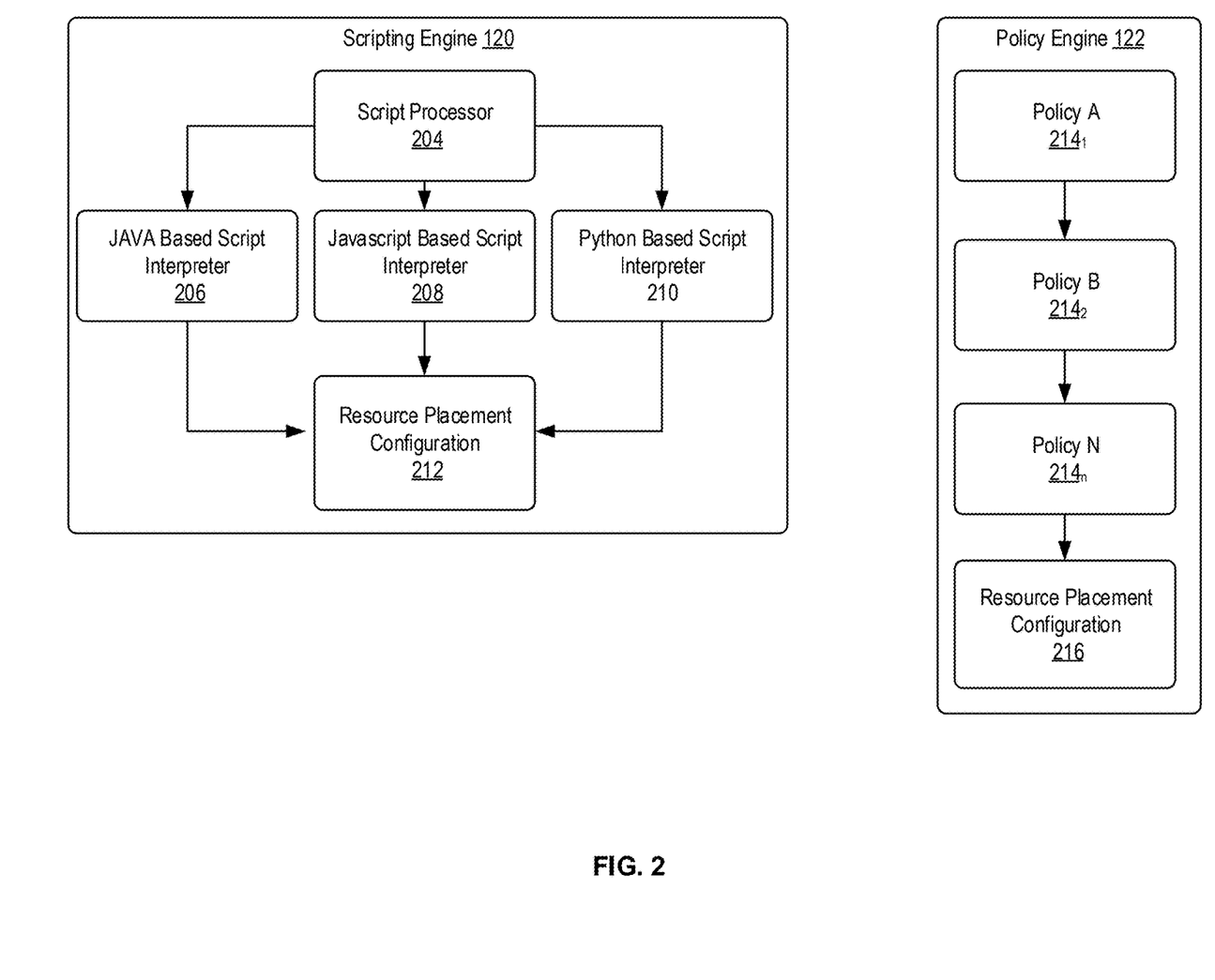
FIG. 2 provides additional details on the scripting engine and policy engine components within a dynamic resource placement system, according to an example of the present disclosure.

FIG. 2 provides additional details on the scripting engine 120 and policy engine 122 components within the dynamic resource placement system 116. The scripting engine 120 contains interpreters and processors to execute scripts written in one or more languages that implement custom resource placement logic. For example, the scripting engine 120 includes a Python-based script interpreter 206 to run scripts written in Python, a JavaScript-based script interpreter 208 to run JavaScript code, and a Java-based script interpreter 210 to execute Java programs. These scripts are stored in repository 128 and retrieved by script processor 204. The script processor 204 invokes the appropriate interpreter to run the scripts. As an example, script 206, written in Java, applies filtering criteria to select an optimal cloud region for a given resource being placed. The results of running the scripts are passed as resource placement configuration 212. Resource placement configuration 212 may include placement details needed to deploy each requested resource in the desired location and properly configured based on the input request and custom placement logic. In examples, the resource placement configuration 212 can include, but is not limited to, a resource identifier, cloud identifier, region identifier, instance type, machine identifier, storage type, storage size, and combinations thereof. The orchestration system could consume resource placement configuration 212 and instantiate the resources accordingly across the specified clouds and accounts. The creation of new resources, as well as the re-deployment of existing resources, can be automated by generating an appropriate resource placement configuration 212.

The policy engine 122 allows chaining together multiple predefined policies 214 to incrementally filter various options. For instance, policy A 2141 and policy B 2142 may specify constraints on geographic region and security compliance, respectively. Running these policies serially results in a narrower set of placement options (e.g., cloud environments) that meet both geographic and security requirements. The policy engine 122 provides the filtered results as resource placement configuration 216. Resource placement configuration 216 may be the same as or similar to resource placement configuration 212. The orchestration system could consume resource placement configuration 216 and instantiate the resources accordingly across the specified clouds and accounts. The creation of new resources as well as re-deployment of existing resources can be automated by generating an appropriate resource placement configuration 216.

The scripting engine 120 and policy engine 122 can be used together or separately to implement flexible custom logic for optimized resource placement. The engines interface with the custom resource placement logic 118 to return the resource placement configuration 212/216 that includes the target cloud and account for deploying each resource.

Figure 3:
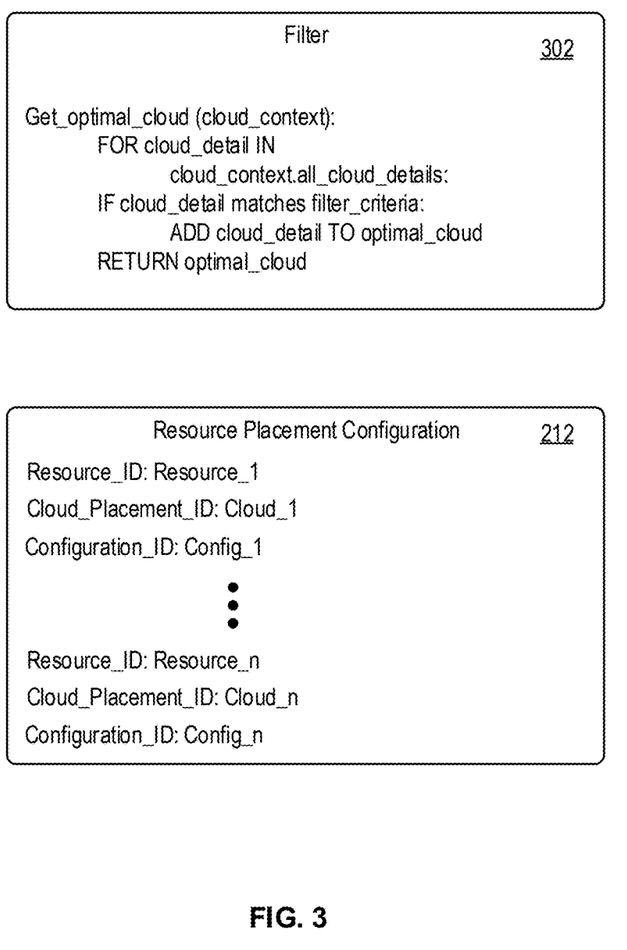
FIG. 3 provides additional details of a user-defined script used to evaluate target cloud environments and a resource placement configuration for a resource deployment request, according to an example of the present disclosure.

FIG. 3 provides details of an example script 302 representing the user-defined custom script 124 used to evaluate the available cloud options and select the optimal target cloud environment for a given resource deployment request. In examples, the script 302 could execute instructions written in languages like Python, Java, or JavaScript that implement custom algorithms for analyzing cloud accounts and regions and applying criteria to determine the best fit. Script 302 could leverage configurable policy rules that incrementally filter the cloud options based on criteria like geography, cost, performance, etc. Script 302 could call external APIs and integrate data like security posture, utilization metrics, latency probes, etc., to inform filtering decisions. Script 302 could run machine learning models that match resource requirements to optimal placement based on historical usage data. Script 302 could execute simulated workloads with proposed deployments and filter options that don't meet resilience, scaling, or redundancy standards.

Example pseudocode provided in FIG. 3 describes an algorithm for filtering a list of cloud options to select an optimal cloud for resource placement. As an example, the script 302 can define a function called get_optimal_cloud( ) that takes a cloud_context as a parameter. The script 302 can then start a "for loop" to iterate through each cloud_detail in the provided cloud_context. The script then checks if the current cloud_detail matches some defined filter_criteria. If there is a match, that cloud_detail is added to a list called optimal_cloud. After the "for loop" completes, the function returns the optimal_cloud list. In summary, the pseudocode of script 302 accepts a cloud_context containing a list of cloud details, loops through each cloud, evaluating against filter criteria, collects clouds that match criteria into an optimal list, and returns list of filtered/optimal clouds. This allows customizable filtering criteria to be applied when selecting the target cloud for resource placement. The user can define the desired filters in the code. That is, script 302 functions to encapsulate user-customizable logic that programmatically selects the ideal cloud environment for a resource out of all available options based on the unique criteria of that user. It removes predefined limitations and enables dynamic deployments tailored to evolving needs.

FIG. 3 provides details of an example resource placement configuration 212 generated by dynamic resource placement system 116. The resource placement configuration 212 specifies the target cloud environment and account where each resource should be deployed to meet the placement objectives. The resource placement configuration 212 contains multiple entries, one for each resource needing placement. Each entry has a resource_ID field that uniquely identifies that resource. The cloud_placement_ID field indicates the target cloud environment and specific account within that environment where this resource should be placed. For example, "Cloud_1" may refer to a particular region within an Amazon Web Services (AWS) account. The configuration_ID provides additional parameters that may be relevant for instantiating the resource appropriately in that cloud. For example, for a virtual machine resource, the configuration may specify details like instance type, storage options, network configuration, etc., that are specific to the provider or account.

Figure 4:
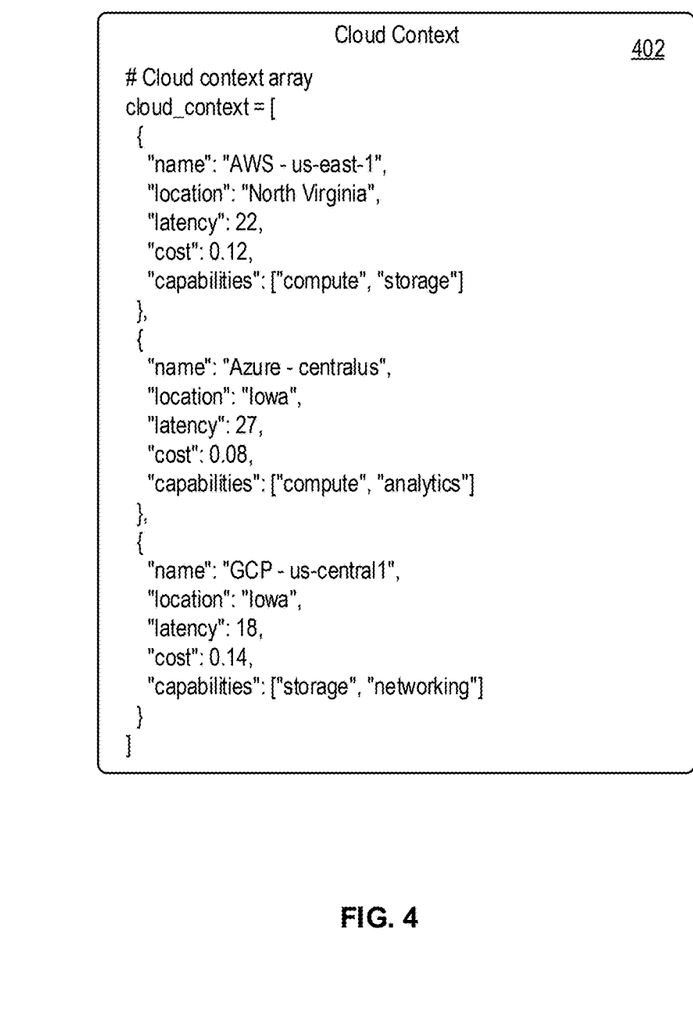
FIG. 4 depicts additional details of a cloud context, according to an example of the present disclosure.

FIG. 4 provides details of a cloud context 402 received at the dynamic resource placement system 116. In general, cloud context 402 is a data structure or object containing details about the available cloud environments 110 that can be used for placing resources 104-108. Cloud context 402 can be represented as a list or array containing cloud objects, each with properties like cost, location, capabilities, etc.; as a database table with rows representing clouds and columns representing their attributes; as a file or data feed with cloud details in a standardized format like CSV, JSON, XML; as an external API providing programmatic query access to cloud details; and/or as cloud inventory data from cloud infrastructure management platform 102. Cloud context 402 encapsulates the universe of possible (e.g., available) cloud environments 110 and accounts that are valid options for resource placement. It provides the input data that custom resource placement logic 118 will evaluate to narrow down the options. That is, cloud context 402 surfaces attributes of each cloud that can be used by the filtering criteria of custom resource placement logic 118 to select the optimal cloud. It serves as the target data set that will get filtered iteratively by the user-defined logic.

Figure 5:
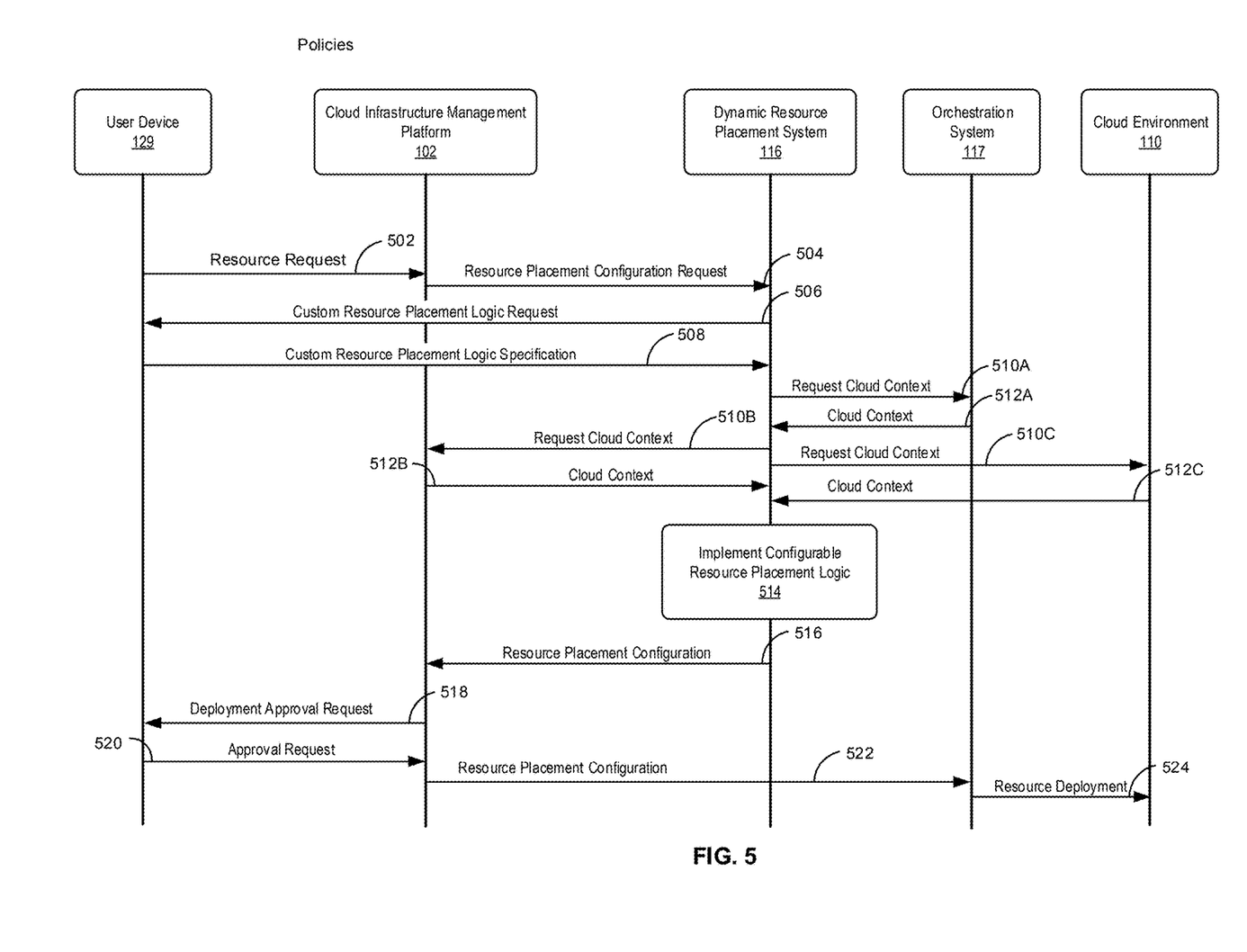
FIG. 5 illustrates a call flow diagram with example operations for deploying one or more resources according to a user-defined custom resource placement logic, according to an example of the present disclosure.

FIG. 5 illustrates a call flow diagram with example operations for deploying one or more resources according to a user-defined custom resource placement logic, according to an example of the present disclosure.

At 502, a user initiates a request via the user device 129 to cloud infrastructure management platform 102 to provision a specific resource. The request contains the specifications for the resource, such as the type, quantity, and size of resources needed. For example, the request indicates two virtual machines requiring sixteen gigabytes of memory and four vCPUs each. In some examples, the request contains an indication, flag, or parameter indicating to the cloud infrastructure management platform 102 that the specific resources are to be placed in accordance with custom resource placement logic. Based on the request, cloud infrastructure management platform 102 analyses the current state of the infrastructure and the requirements of the requested resources. Cloud infrastructure management platform 102 may access a template for deploying resources and applications, where the template is built into and provided innately by cloud infrastructure management platform 102. The template may be a pre-packaged starting point for typical or baseline deployments before additional customization. In some examples, cloud infrastructure management platform 102 may initially populate the template with pre-defined resource placement logic 114 provided by the automated provisioning module 112. Cloud infrastructure management platform 102 may determine that the resources are to be placed in accordance with custom resource placement logic. Accordingly, cloud infrastructure management platform 102 sends a resource placement configuration request to dynamic resource placement system 116 for a resource placement configuration.

At 506, dynamic resource placement system 116 sends a custom resource placement logic request to user device 129 such that a user can specify a custom resource placement logic. The custom resource placement logic may be the same as or similar to the custom resource placement logic 118. In some examples, a user may select a user-defined configurable script, a user-defined configurable policy, or a combination of the user-defined configurable script and the user-defined configurable policy. In some examples, the user may specify a script 124 and/or a policy 126 to retrieve and load from repository 128. At 508, the user device 129 provides the custom resource placement logic specification to dynamic resource placement system 116.

At 510A-510C, dynamic resource placement system 116 may request a cloud context from the orchestration system 117, from the cloud infrastructure management platform 102, and/or from a cloud environment 110. That is, dynamic resource placement system 116 discovers available cloud environments and accounts for placing the new resources. This may involve querying public cloud providers via API for details on available regions, instance types, capacity, costs, etc. Alternatively, the cloud context is requested from cloud infrastructure management platform 102.

In some examples, the cloud context is provided by the orchestration system 117 at 512A, the cloud infrastructure management platform 102 at 512B, and/or the cloud environment 110 at 512C. The dynamic resource placement system 116 then implements the custom resource placement logic at 514 using the received cloud context in a manner previously described with respect to FIGS. 1A-4. The dynamic resource placement system 116 can then provide the resource placement configuration to the cloud infrastructure management platform 102 at 516. The cloud infrastructure management platform 102 can then populate the template based on the resource placement configuration. In some examples, the cloud infrastructure management platform 102 sends a deployment approval request at 518 to the user device 129, where the deployment approval request specifies where the resources will be placed and is based on the resource placement configuration. A user may approve the deployment approval request at 520 to continue with the deployment process. In some examples, the cloud infrastructure management platform 102 may forego the approval request and instead send the template and/or resource placement configuration to the orchestration system 117. The orchestration system 117 then places the requested resources in a cloud environment 110 in accordance with the resource placement configuration.

Figure 6:
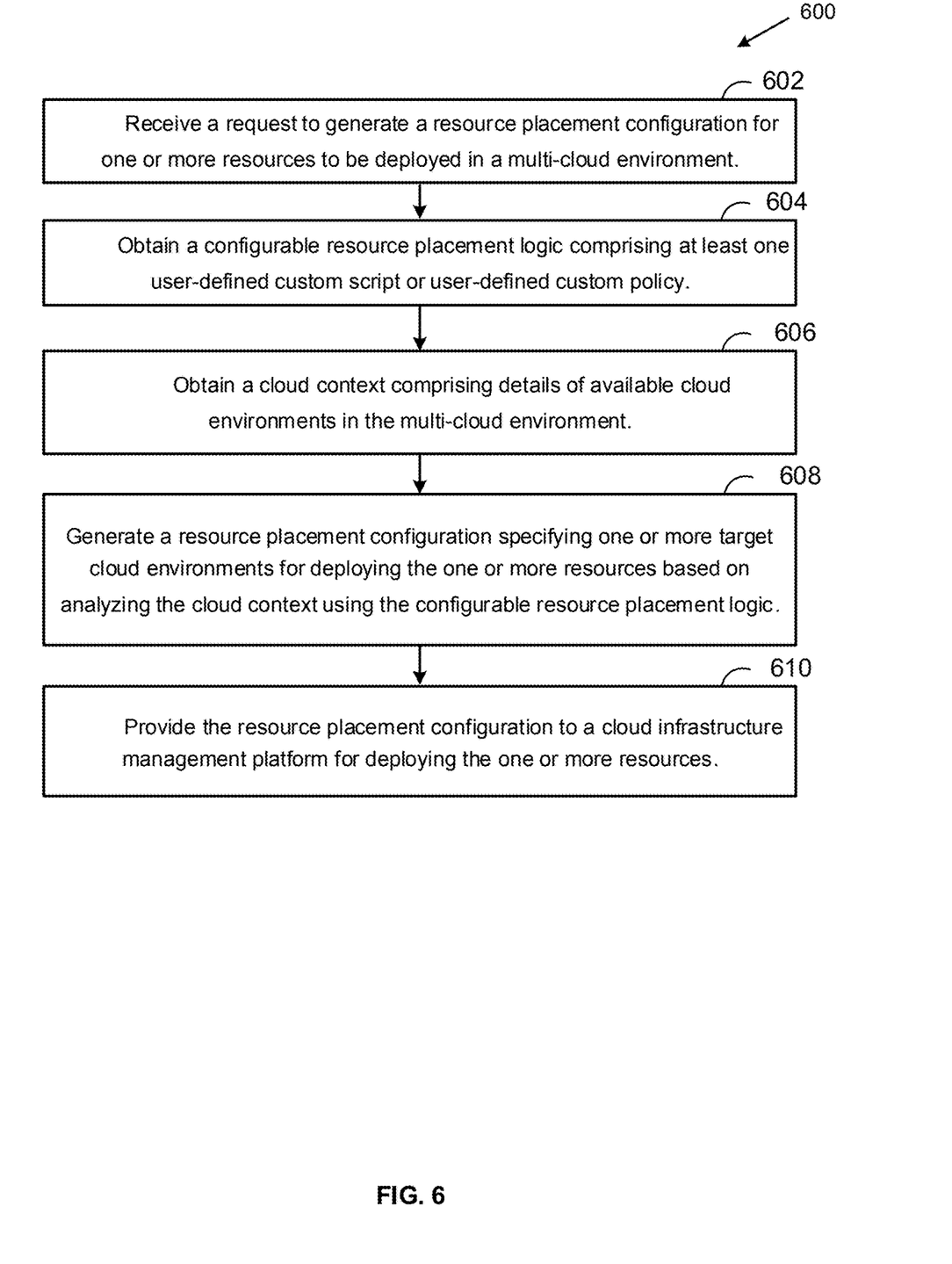
FIG. 6 is a flow diagram illustrating example operations for deploying one or more resources according to a user-defined custom resource placement logic.

FIG. 6 is a flow diagram illustrating example operations 600 for deploying resources in a multi-cloud environment, according to an example embodiment of the present application. In examples, the operations 600 can be performed by one or more processors of the dynamic resource placement system 116.

At operation 602, the dynamic resource placement system receives a request to generate a resource placement configuration for one or more resources to be deployed in a multi-cloud environment. At operation 604, the dynamic resource placement system obtains a custom resource placement logic comprising at least one user-defined custom script or user-defined custom policy. In some examples, at least one user-defined custom script is written in a scripting language and applies configurable filters to select one or more target cloud environments based on user-defined criteria. In some examples, at least one user-defined custom policy comprises a plurality of configurable policy rules that are applied serially to filter the available cloud environments based on user-defined criteria. In some examples, obtaining the custom resource placement logic comprises receiving, from a user device, an indication of at least one user-defined custom script or user-defined custom policy stored in a repository.

At operation 606, the dynamic resource placement system obtains a cloud context comprising details of available cloud environments in the multi-cloud environment. In some examples, the cloud context comprises a list of cloud objects representing the available cloud environments, each cloud object specifying attributes of a corresponding cloud environment. In some examples, obtaining the cloud context comprises querying at least one of an orchestration system managing the multi-cloud environment, the cloud infrastructure management platform, or one or more cloud environments of the multi-cloud environment.

At operation 608, the dynamic resource placement system generates a resource placement configuration specifying one or more target cloud environments for deploying one or more resources based on analyzing the cloud context using the custom resource placement logic. In some examples, the dynamic resource placement system generates the resource placement configuration by evaluating the available cloud environments represented in the cloud context using the custom resource placement logic and selecting one or more target cloud environments based on the evaluation. In some examples, the resource placement configuration specifies, for each resource, a resource identifier, a cloud identifier representing the target cloud environment, and a configuration identifier providing parameters for deploying the resource in the target cloud environment. At operation 610, the dynamic resource placement system provides the resource placement configuration to a cloud infrastructure management platform for deploying the one or more resources.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

The invention claimed is:

1. A method for deploying resources in a multi-cloud environment, the method comprising:
    receiving, by a dynamic resource placement system, a request to generate a resource placement configuration for one or more resources to be deployed in a multi-cloud environment;
    obtaining, by the dynamic resource placement system, a custom resource placement logic, the custom resource placement logic comprising at least one user-defined custom script or user-defined custom policy;
    obtaining, by the dynamic resource placement system, a cloud context comprising details of available cloud environments in the multi-cloud environment;
    generating, by the dynamic resource placement system and based on analyzing the cloud context using the custom resource placement logic, a resource placement configuration specifying one or more target cloud environments for deploying the one or more resources; and
    providing, by the dynamic resource placement system, the resource placement configuration to a cloud infrastructure management platform for deploying the one or more resources.

2. The method of claim 1, wherein generating the resource placement configuration comprises:
    evaluating the available cloud environments represented in the cloud context using the custom resource placement logic; and
    selecting the one or more target cloud environments based on the evaluation.

3. The method of claim 2, wherein the cloud context comprises a list of cloud objects representing the available cloud environments, each cloud object specifying attributes of a corresponding cloud environment.

4. The method of claim 3, wherein obtaining the cloud context comprises querying at least one of: an orchestration system managing the multi-cloud environment, the cloud infrastructure management platform, or one or more cloud environments of the multi-cloud environment.

5. The method of claim 2, wherein the at least one user-defined custom script is written in a scripting language and applies configurable filters to select the one or more target cloud environments based on user-defined criteria.

6. The method of claim 2, wherein the at least one user-defined custom policy comprises a plurality of configurable policy rules that are applied serially to filter the available cloud environments based on user-defined criteria.

7. The method of claim 1, wherein obtaining the custom resource placement logic comprises receiving, from a user device, an indication of at least one user-defined custom script or user-defined custom policy stored in a repository.

8. The method of claim 1, further comprising interfacing with one or more external data sources to obtain real-time cost, compliance, or utilization data for dynamically generating the resource placement configuration.

9. The method of claim 1, wherein the resource placement configuration specifies, for each resource, a resource identifier, a cloud identifier representing the target cloud environment, and a configuration identifier providing parameters for deploying the resource in the target cloud environment.

10. A processing system, comprising:
one or more memories comprising computer-executable instructions; and
one or more processors configured to execute the computer-executable instructions and cause the processing system to:
receive a request to generate a resource placement configuration for one or more resources to be deployed in a multi-cloud environment;
obtain a custom resource placement logic specified by a user, the custom resource placement logic comprising at least one user-defined custom script or user-defined custom policy;
obtain a cloud context comprising details of available cloud environments in the multi-cloud environment;
generate, based on analyzing the cloud context using the custom resource placement logic, a resource placement configuration specifying one or more target cloud environments for deploying the one or more resources; and
provide the resource placement configuration to a cloud infrastructure management platform for deploying the one or more resources.

11. The processing system of claim 10, wherein the one or more processors are further configured to cause the processing system to:
evaluate the available cloud environments represented in the cloud context using the custom resource placement logic; and
select the one or more target cloud environments based on the evaluation.

12. The processing system of claim 11, wherein the cloud context comprises a list of cloud objects representing the available cloud environments, each cloud object specifying attributes of a corresponding cloud environment.

13. The processing system of claim 11, wherein the at least one user-defined custom script is written in a scripting language and applies configurable filters to select the one or more target cloud environments based on user-defined criteria.

14. The processing system of claim 10, wherein the at least one user-defined custom policy comprises a plurality of configurable policy rules that are applied serially to filter the available cloud environments based on user-defined criteria.

15. The processing system of claim 10, wherein the resource placement configuration specifies, for each resource, a resource identifier, a cloud identifier representing the target cloud environment, and a configuration identifier providing parameters for deploying the resource in the target cloud environment.

16. A non-transitory computer-readable medium storing program code for causing a processing system to perform the steps of:
receiving a request to generate a resource placement configuration for one or more resources to be deployed in a multi-cloud environment;
obtaining a custom resource placement logic specified by a user, the custom resource placement logic comprising at least one user-defined custom script or user-defined custom policy;
obtaining a cloud context comprising details of available cloud environments in the multi-cloud environment;
generating, based on analyzing the cloud context using the custom resource placement logic, a resource placement configuration specifying one or more target cloud environments for deploying the one or more resources; and
providing the resource placement configuration to a cloud infrastructure management platform for deploying the one or more resources.

17. The non-transitory computer-readable medium of claim 16, wherein the program code causes the processing system to perform the steps of:
evaluating the available cloud environments represented in the cloud context using the custom resource placement logic; and
selecting the one or more target cloud environments based on the evaluation.

18. The non-transitory computer-readable medium of claim 17, wherein the at least one user-defined custom script is written in a scripting language and applies configurable filters to select the one or more target cloud environments based on user-defined criteria.

19. The non-transitory computer-readable medium of claim 17, wherein the user-defined custom policy comprises a plurality of configurable policy rules that are applied serially to filter the available cloud environments based on user-defined criteria.

20. The non-transitory computer-readable medium of claim 16, wherein the resource placement configuration specifies, for each resource, a resource identifier, a cloud identifier representing the target cloud environment, and a configuration identifier providing parameters for deploying the resource in the target cloud environment.

* * * * *